Sept. 10, 1968            W. Y. BROWN            3,400,863
SAFETY ACCESS COVERS FOR PNEUMATIC PRESSURE COMPARTMENTS OF
PRESSURE-FEEDING GREASE CONTAINERS
Filed Sept. 2, 1966                          2 Sheets-Sheet 1
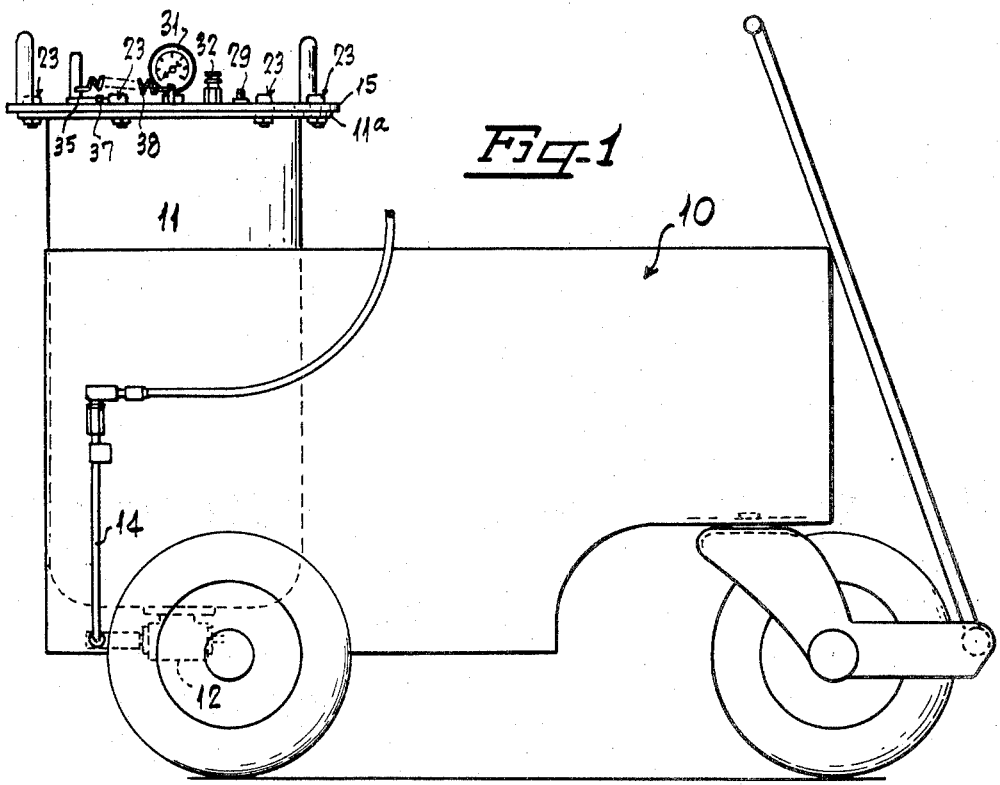
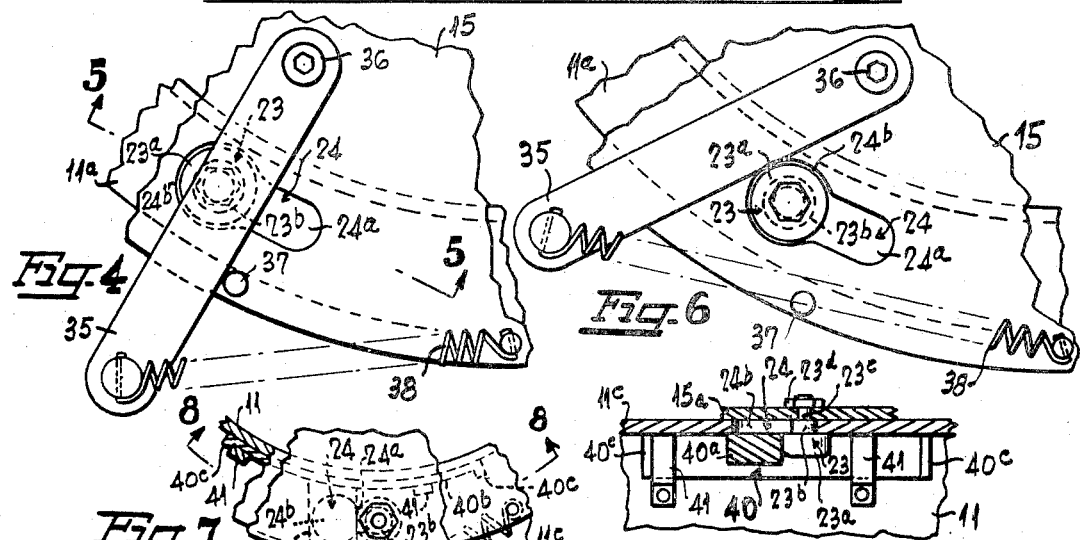
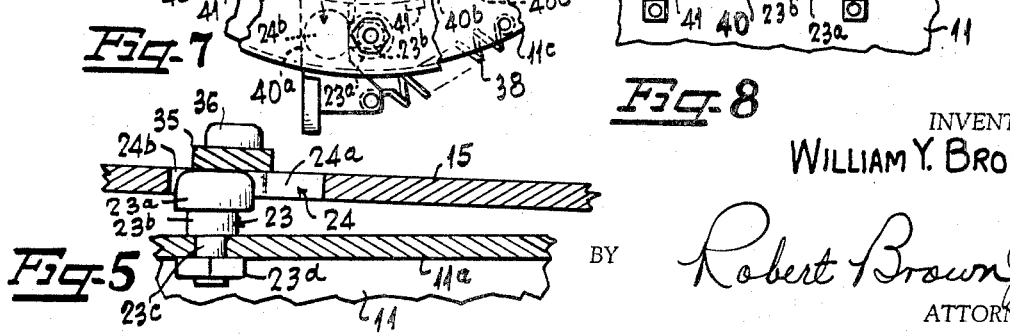
INVENTOR:
WILLIAM Y. BROWN
BY Robert Brown Jr.
ATTORNEY Sept. 10, 1968 W. Y. BROWN 3,400,863
SAFETY ACCESS COVERS FOR PNEUMATIC PRESSURE COMPARTMENTS OF
PRESSURE-FEEDING GREASE CONTAINERS
Filed Sept. 2, 1966 2 Sheets-Sheet 2

INVENTOR:
WILLIAM Y. BROWN
By Robert Brown Jr.
ATTORNEY

United States Patent Office 3,400,863
Patented Sept. 10, 1968

3,400,863
SAFETY ACCESS COVERS FOR PNEUMATIC PRESSURE COMPARTMENTS OF PRESSURE-FEEDING GREASE CONTAINERS
William Y. Brown, Charlotte, N.C., assignor to Brown Grease Gun Company, Inc., Charlotte, N.C., a corporation of North Carolina
Filed Sept. 2, 1966, Ser. No. 576,981
3 Claims. (Cl. 222—397)

ABSTRACT OF THE DISCLOSURE

A safety access cover for the pneumatic pressure compartment of a pressure-feeding grease container in which the cover for the access opening is held either in ajar position or else in a fastened closed position, in combination with means for preventing the cover from assuming a position intermediate the two first-named positions.

This invention relates to pressure-fed lubricating apparatus and more especially to a safety mechanism for preventing premature or accidental accumulation of uncontrolled high pressure in the pneumatic pressure compartment thereof while preparing the apparatus for operation. The safety mechanism hereinafter described is adapted for operation with lubricant containers of the type disclosed in FIGURE 4 of my Patent No. 2,016,888, issued Oct. 8, 1935, wherein the container is divided by a movable grease follower into an upper fluid pressure compartment and a lower grease dispensing compartment.

For the purpose of expediting inspection and replenishing of the lubricant supply in the above-mentioned type of container, it has been found essential to provide an access opening with a quickly attachable and releasable cover thereover. Heretofore, the cover has been constructed and arranged to fit over the opening in either of two closed positions, namely, an initial unsecured closed position at which only atmospheric or slightly higher pressures may be safely introduced into the pressure chamber, and a firmly secured position at which time relatively high pressures may be safely introduced as an auxiliary force for dispensing the lubricant from the lubricant compartment therebelow. On conventional grease containers, the cover is often inadvertently left in the unsecured closed position during periods of non-use, and especially following replenishment of the grease supply. Although the cover may not be securely attached over the opening in the last-named position, it has been found that the inside lubricant coating will often hold the cover in position against quite a substantial internal pressure; but upon the introduction of further pressure, the seal will break and the cover will be violently hurled from the container thereby endangering or injuring nearby workmen.

It is therefore an object of this invention to provide an access cover which will obviate the aforementioned hidden dangers which have accompanied the operation of pressure-feeding lubrication equipment.

Some of the objects of invention having been stated, other objects will appear as the description proceeds when taken in connection with the accompanying drawings, in which, FIGURE 1 is a side elevation of a pressure-fed grease gun having a supply container with my improved safety mechanism incorporated therein;

FIGURE 4 is an enlarged fragmentary plan view of a portion of the cover and showing the safety mechanism holding the cover in a partially opened unsecured position;

FIGURE 5 is a sectional view taken along line 5—5 in FIGURE 4;

FIGURE 6 is a view similar to FIGURE 4 but showing the position of the safety mechanism when manually held against normal spring tension in a position which will permit the cover to move from the partially opened unsecured position shown in FIGURE 4 to an unsecured closed position over the access opening;

FIGURE 7 is a detailed plan view of a modified form of invention showing the cover held in secured closed position, and FIGURE 8 is a sectional view taken along line 8—8 in FIGURE 7.

Figure 2:
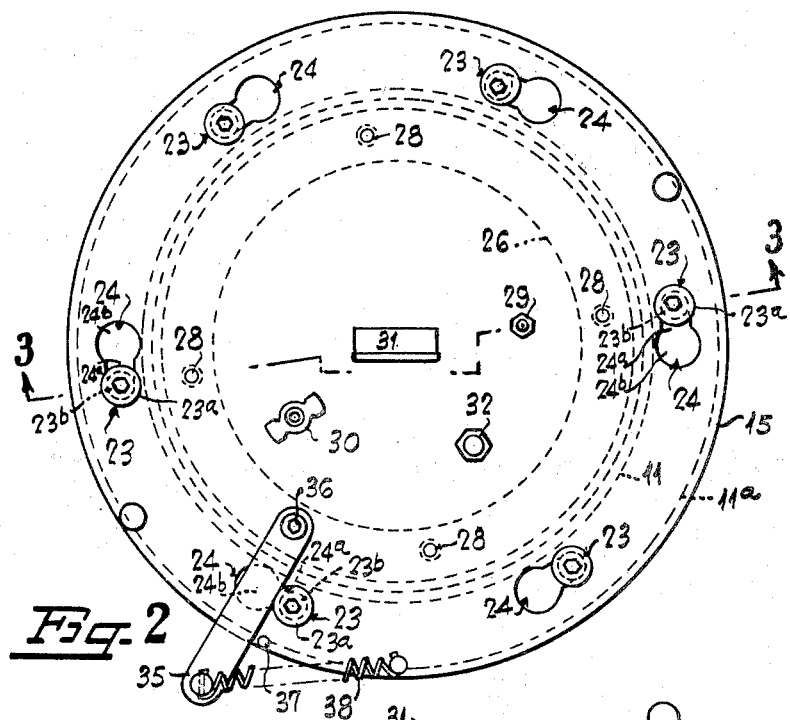
FIGURE 2 is an enlarged plan view of the container illustrated in FIGURE 1, showing the position of the safety mechanism when the container access opening cover is in a secured closed position.

Referring more particularly to the drawings, the numeral 10 broadly denotes a portable lubricating apparatus having a vertically disposed lubricant supply container 11, a pump 12 communicating with the lower interior of the container, and a dispensing conduit 14 communicating with the pump outlet, all of said parts being constructed somewhat similar to and operable substantially in the same manner as described in my above-mentioned patent.

The upper end of container 11 has an access opening over which a cover 15 is adapted to be mounted in either a partially opened unsecured position, or a closed unsecured position, or a closed secured position. In either of the three positions above, the weight of the cover normally biases the latter toward closed position.

The interior of container 15 is divided into a lower lubricant compartment 16 and an upper pressure compartment 17 by a grease follower 18. The follower is manually removable and insertable through the upper access opening by means of handles 19, said follower being provided with a plug 20 which may be removed to permit air to escape from the lubricant compartment upwardly into the pressure compartment.

Container 11 has integral with the upper end thereof an annular outstanding flange 11a having an upper flat surface adapted to support the lower flat surface of cover 15 when the latter is in a closed position over the access opening. The cover 15 may be mounted over the access opening in either of the aforementioned positions by means including a plurality of upwardly extending pins or projections 23 in flange 11a and a plurality of corresponding recesses or slots 24 in the cover for receiving the projections. The projections and slots are arranged in two circles of the same diameter so that limited rotation of the cover can be effected. The specific construction of the projections 23 and cooperating slots 24 facilitates quick removal or installation of the cover. It will be observed (FIGURES 4, 5 and 6) that each projection 23 comprises an enlarged head portion 23a disposed above and in spaced relation to the upper surface of flange 11a, a restricted shouldered portion 23b extending downwardly from the head portion and resting upon the upper surface of the flange, and a still further restricted portion 23c extending downwardly from portion 23b and through flange 11a, and a nut 23d on the lower projecting end of portion 23c.

It will be further observed that each slot 24 is of the bayonet type and comprises a relatively narrow end portion 24a having a width substantially the same as the diameter of the shoulder portion 23b of projection 23, and an opposite end portion 24b having a diameter slightly greater than that of the head portion 23a.

Figure 3:
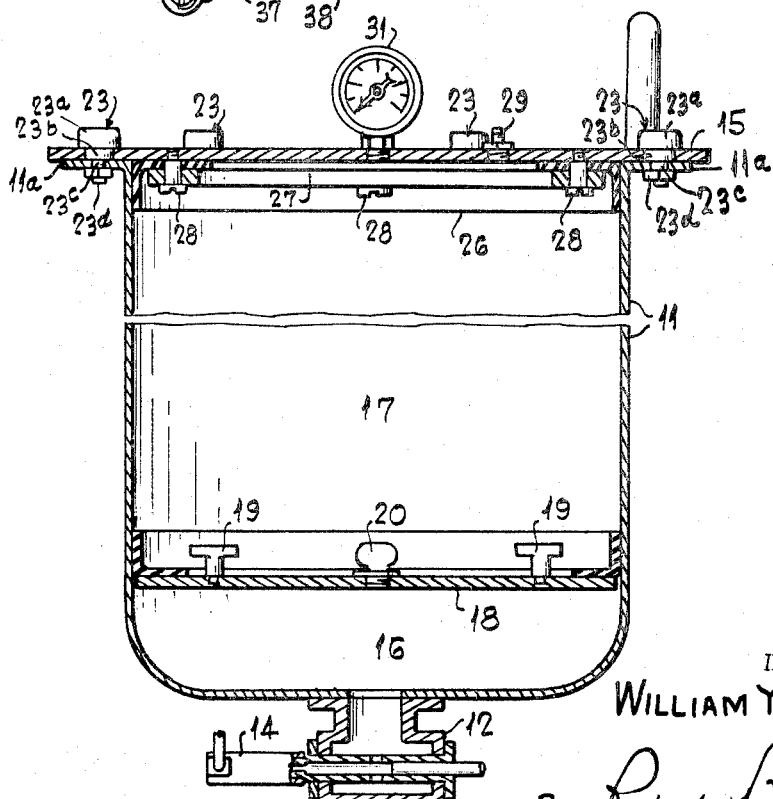
FIGURE 3 is a vertical sectional view, with portions thereof broken away, taken along line 3—3 in FIGURE 2.

To remove cover 15 from the container when in the closed secured position shown in FIGURES 1–3, it is rotated in a counterclockwise direction (FIGURE 2) until head portions 23a coincide with slot portions 24b as shown in FIGURE 6, and then lifted upwardly. The reverse procedure is employed to secure the cover in closed position as shown in FIGURE 2.

Cover 15 has an annular flexible seal 26 secured to the lower face thereof by means of a ring 27 and shoulder screws 28, said seal being adapted to fit closely against the inner upper wall of the container and confine fluid pressure in the pressure compartment 17. Air or other fluid pressure is introduced and released from compartment 17 by means of inlet valve 29 and bleeder valve 30 in the cover. Conventional pressure gauge 31 and safety valve 32 are also provided in cover 15.

Heretofore it has been found that during use of the lubricating apparatus consisting only of the structure thus far described, the operator sometimes inadvertently introduces air pressure into compartment 17 through valve 29 when the cover is in the unsecured closed position shown in FIGURE 6. In this cover position, although unsecured, an undeterminate resistance to the pressure in chamber may be offered without breaking the seal between the cover and the container. When, however, this resistance is overcome during introduction of air or fluid pressure into chamber 17, the cover is thrown upwardly with considerable force, thus endangering persons standing nearby.

In order to prevent cover 15 from normally assuming an unsecured closed position such as shown in FIGURE 6, a lever 35 is pivotally secured as at 36 to the upper portion of the cover, the free end of said lever being yieldably urged in a clockwise direction about pivot 36 and toward stop pin 37 (FIGURE 2) by means of a tension spring 38.

When the lubricating apparatus is in storage or during servicing operations, the pressure is released from pressure chamber 17 and the cover 15 preferably removed to a partially opened position such as shown in FIGURES 4 and 5, at which time all of the projections 23 partially penetrate the corresponding slot portions 24b in the cover because the normal position of lever 35 will prevent complete penetration of the projection 23 therebelow. Thus, the cover cannot assume a closed unsecured position such as shown in FIGURE 6 without first rotating lever 35 against spring tension until it clears the path of penetration of the associated projection.

To install cover 15 in the secured closed position shown in FIGURE 2, the lever 35 is rotated from the position shown in FIGURE 4 to the position shown in FIGURE 6 to permit the ajar cover to fall first to unsecured closed position. In the last-named position all of the projections 23 will fully penetrate the corresponding slot portions 24b and the head portion 23a of one of the projections will be disposed in the path of lever 35 as it returns to normal position under the tension of spring 38; consequently, the lever 35, when manually released, will engage the head portion 23a to automatically rotate the cover to the secured closed position shown in FIGURE 2.

FIGURES 7 and 8 show a modified form of the invention in which the position of parts of the safety mechanism are reversed as between the container and cover, that is, the projections 23 are mounted on cover 15a and the coincidable slots 24 are disposed in outstanding flange 11c of the container. Also, a safety member 40, corresponding to pivoted lever 35 in the preceding form, is slidably mounted upon container 11 by means of guides 41, said member being normally urged under the tension of spring 38 to a position where the outstanding arm 40a thereof will cover slot portion 24b and block the penetration of the projection 23 therebelow. Member 40 also includes an arcuate portion 40b having end projections 40c engageable with guides 41 to respectively limit the sliding movement in opposite directions. The method of operation of the modified form of invention is substantially the same as that of the previously described form.

In both forms of invention, one of the slot portions 24b is normally blocked by a projection 23 to hold the cover in a partially opened and confined position over the access opening. Furthermore, each form discloses means for manually unblocking the blocked slot portion 24b to allow the cover to assume a closed unsecured position, in combination with means operable upon the manual release of the unblocking means for automatically rotating the cover from the last-named position to a secured closed position.

What I claim as new and desire to obtain Letters Patent of the United States on is set forth in the following claims:

1. In a pressure-feeding lubricating apparatus having a pneumatic pressure compartment element with an access opening in the upper portion thereof, and a lubrication means responsive to the pressure from said element, a safety mechanism for preventing uncontrolled pressure accumulation within said compartment element comprising: a cover element for said access opening, means including the weight of said cover element for normally biasing the latter toward closed position over said opening, said means including, on one hand, a pair of studs extending respectively from opposite sides of one of said elements and in substantially parallel relationship to and on opposite sides of the axis of said opening and, on the other hand, a pair of keyhole slots in the other element for axially receiving said studs, said studs having restricted neck portions for respectively receiving the restricted areas of said keyhole slots upon movement of said cover element transversely of said axis from said closed position to an axially confined position, means cooperating with and, operable upon axial separation of, the stud and slot at one side of said axis for releasably supporting the associated side of said cover element in an ajar position over said access opening whereby the weight of the cover element will return the ajarred side thereof to closed position upon release of the supporting means, and yieldable means coacting with said supporting means and the associated stud upon movement of the cover element to closed position for moving the last-named element to said axially confined position.

2. A safety mechanism as defined in claim 1 wherein said studs extend from said compartment element and said keyhole slots are disposed in said cover element.

3. A safety mechanism as defined in claim 1 wherein said studs extend from said cover element and said keyhole slots are disposed in said compartment element.

References Cited

UNITED STATES PATENTS

| | | | |
|---|---|---|---|
| 320,834 | 6/1885 | Argerbright | 292—303 |
| 1,534,131 | 4/1925 | McBride | 292—304 |
| 1,630,899 | 5/1927 | Lynch | 222—387 |
| 2,046,342 | 7/1936 | Muck et al. | 292—352 |
| 2,117,393 | 5/1938 | Batesom. | |
| 2,647,294 | 8/1953 | Davis | 292—304 X |
| 2,742,105 | 4/1956 | Dow. | |
| 3,208,643 | 9/1965 | Phillips | 222—176 |

SAMUEL F. COLEMAN, *Primary Examiner.*

N. L. STACK, *Assistant Examiner.*